(12) United States Patent
Broughton et al.

(10) Patent No.: US 10,527,125 B2
(45) Date of Patent: Jan. 7, 2020

(54) INTERNAL COMBUSTION ENGINE ASSEMBLY HAVING A FLYWHEEL

(71) Applicant: BRP US INC., Sturtevant, WI (US)

(72) Inventors: George Broughton, Wadsworth, IL (US); Mark C. Noble, Pleasant Prairie, WI (US); Richard McChesney, Waukegan, IL (US); Samuel McGinley, Milwaukee, WI (US)

(73) Assignee: BRP US INC., Sturtevant, WI (US)

( * ) Notice: Subject to any disclaimer, the term of this patent is extended or adjusted under 35 U.S.C. 154(b) by 0 days.

(21) Appl. No.: 16/328,892

(22) PCT Filed: Jul. 12, 2017

(86) PCT No.: PCT/IB2017/054224
§ 371 (c)(1),
(2) Date: Feb. 27, 2019

(87) PCT Pub. No.: WO2018/042267
PCT Pub. Date: Mar. 8, 2018

(65) Prior Publication Data
US 2019/0186592 A1 Jun. 20, 2019

Related U.S. Application Data

(60) Provisional application No. 62/381,696, filed on Aug. 31, 2016.

(51) Int. Cl.
*F16F 15/131* (2006.01)
*F02N 11/04* (2006.01)
(Continued)

(52) U.S. Cl.
CPC ....... *F16F 15/13157* (2013.01); *B63H 20/14* (2013.01); *B63H 20/32* (2013.01);
(Continued)

(58) Field of Classification Search
CPC combination set(s) only.
See application file for complete search history.

(56) References Cited

U.S. PATENT DOCUMENTS 2,909,146 A 10/1959 Strang
3,318,425 A 5/1967 Weber et al.
(Continued)

FOREIGN PATENT DOCUMENTS

JP 1182627 A 3/1999

OTHER PUBLICATIONS

English translation of the abstract of Japanese patent JPH1182627, retrieve from Espacenet on Nov. 13, 2017.
International Search Report issued for International Application No. PCT/IB2017/054224 dated Nov. 6, 2017.

*Primary Examiner* — Hung Q Nguyen
(74) *Attorney, Agent, or Firm* — BCF LLP

(57) ABSTRACT

An internal combustion engine assembly has a crankcase, a cylinder block connected to the crankcase, the cylinder block defining at least one cylinder, at least one piston disposed in the at least one cylinder, a crankshaft disposed at least in part in the crankcase and operatively connected to the at least one piston, and a flywheel operatively connected to and driven by the crankshaft. The crankshaft rotates in a first direction about a crankshaft axis. The flywheel rotates in a second direction opposite the first direction about the flywheel axis. A clutch selectively operatively connects the crankshaft to the flywheel. A marine outboard engine having the internal combustion engine assembly is also disclosed.

21 Claims, 10 Drawing Sheets

(51) Int. Cl.
*F02N 3/02* (2006.01)
*F02N 15/02* (2006.01)
*B63H 20/14* (2006.01)
*B63H 20/32* (2006.01)
*F02B 63/04* (2006.01)
*F02B 75/16* (2006.01)
*F16F 15/30* (2006.01)
*H02K 7/02* (2006.01)
*H02K 7/18* (2006.01)

(52) U.S. Cl.
CPC ............ *F02B 63/042* (2013.01); *F02B 75/16* (2013.01); *F02N 3/02* (2013.01); *F02N 11/04* (2013.01); *F02N 15/022* (2013.01); *F16F 15/13121* (2013.01); *F16F 15/30* (2013.01); *H02K 7/02* (2013.01); *H02K 7/1815* (2013.01)

(56) References Cited

U.S. PATENT DOCUMENTS

| | | | | |
|---|---|---|---|---|
| 4,262,552 | A | * | 4/1981 | Honda .................... F02B 75/06 |
| | | | | 192/103 F |
| 4,856,639 | A | * | 8/1989 | Fukushima ......... F16F 15/1207 |
| | | | | 192/55.61 |
| 4,928,553 | A | * | 5/1990 | Wagner .................... F16H 33/02 |
| | | | | 475/267 |
| 5,570,615 | A | | 11/1996 | Westphal et al. |
| 6,561,336 | B1 | | 5/2003 | Huart et al. |
| 6,915,720 | B2 | * | 7/2005 | Yamazaki ............... F16F 15/31 |
| | | | | 74/572.21 |
| 2008/0277132 | A1 | | 11/2008 | Pesik et al. |
| 2010/0071652 | A1 | * | 3/2010 | Almhagen ............. F02N 11/00 |
| | | | | 123/185.14 |
| 2014/0366832 | A1 | | 12/2014 | Tsunoda |
| 2015/0038290 | A1 | * | 2/2015 | Bichler .................... B60K 6/48 |
| | | | | 477/5 |

\* cited by examiner

INTERNAL COMBUSTION ENGINE ASSEMBLY HAVING A FLYWHEEL

CROSS-REFERENCE

The present application claims priority to U.S. Provisional Patent Application No. 62/381,696, filed Aug. 31, 2016, the entirety of which is incorporated herein by reference.

FIELD OF TECHNOLOGY

The present technology relates to internal combustion engine assemblies, and more specifically to internal combustion engine assemblies having a flywheel.

BACKGROUND

The impulse created at each detonation is a significant contributor to the noise, vibration and harshness (NVH) of an internal combustion engine. Generally, a single cylinder engine produces greater NVH than a multi-cylinder engine of equal displacement. This is because a single cylinder engine produces a single detonation per engine revolution, whereas a multi-cylinder engine producing the same power spreads that power out over multiple detonations per revolution. This spread of power in multi-cylinder engines both reduces the magnitude of each detonation and increases the frequency of detonations, rendering them less noticeable.

However, multi-cylinder engines have the downside of having more moving parts and complexity. This increases frictional losses and cost, and provides slightly less power per unit of displacement.

Most engines have a flywheel attached to the crankshaft outside the combustion chamber that serves to smooth out the combustion cycle impulses and by storing energy to be used between detonations. When a ring gear, used for starting the engine, and/or a magneto, used for generating electricity, are present, the moments of inertia of these components are added to the moment of inertia of the flywheel. Greater moments of inertia of the flywheel and of components turning in the same direction as the flywheel result in greater smoothing out of the impulses created during the combustion cycle. However, even with such a flywheel, there remains unbalanced forces that cause NVH, including an unopposed couple on the engine block created by the cylinder side wall force.

There is therefore a need for an internal combustion engine assembly having a system for smoothing out the combustion cycle impulses.

There is also a need for a single cylinder engine assembly having such a system.

SUMMARY

It is an object of the present technology to ameliorate at least some of the inconveniences present in the prior art.

According to one aspect of the present technology, there is provided an internal combustion engine assembly having a crankcase, a cylinder block connected to the crankcase, the cylinder block defining at least one cylinder, at least one piston disposed in the at least one cylinder, a crankshaft disposed at least in part in the crankcase and operatively connected to the at least one piston, and a flywheel operatively connected to and driven by the crankshaft. The crankshaft rotates in a first direction about a crankshaft axis. The flywheel rotates in a second direction opposite the first direction about the flywheel axis. A clutch selectively operatively connects the crankshaft to the flywheel.

In some implementations of the present technology, the flywheel is disposed externally of the crankcase and the cylinder block.

In some implementations of the present technology, the clutch disconnects the flywheel from the crankshaft when the crankshaft rotates above a clutch engagement speed.

In some implementations of the present technology, the clutch is coaxial with the crankshaft and rotates in the first direction.

In some implementations of the present technology, a first gear is connected to the clutch, and a second gear is connected to the flywheel and coaxial with the flywheel. The second gear engages the first gear.

In some implementations of the present technology, a manual start assembly is operatively connected to the flywheel.

In some implementations of the present technology, the manual start assembly has: a rope spool connected to and coaxial with the flywheel, a rope at least partially wound around the rope spool, and a handle connected to the rope. The rope spool, the rope and the handle form at least part of a rope-start system of the engine assembly.

In some implementations of the present technology, the flywheel axis is parallel to and offset from the crankshaft axis.

In some implementations of the present technology, the at least one cylinder is a single cylinder, and the at least one piston is a single piston.

In some implementations of the present technology, the flywheel is a second flywheel, and the flywheel axis is a second flywheel axis. The internal combustion engine assembly also has a first flywheel operatively connected to and driven by the crankshaft. The first flywheel rotates in the first direction about a first flywheel axis. The second flywheel is operatively connected to and driven by the first flywheel.

In some implementations of the present technology, the first and second flywheels are disposed externally of the crankcase and the cylinder block on a same side of the crankcase and the cylinder block.

In some implementations of the present technology, at least a portion of the second flywheel is disposed between the first flywheel and at least one of the crankcase and the cylinder block.

In some implementations of the present technology, the clutch selectively operatively connects the first flywheel to the second flywheel.

In some implementations of the present technology, the clutch disconnects the first flywheel from the second flywheel when the crankshaft rotates above a clutch engagement speed.

In some implementations of the present technology, the clutch is coaxial with the crankshaft and the first flywheel, and rotates in the first direction.

In some implementations of the present technology, a first gear connected to the clutch, and a second gear is connected to the second flywheel and is coaxial with the second flywheel. The second gear engages the first gear.

In some implementations of the present technology, a gear ratio of the first and second gears is less than one. The gear ratio corresponds to a number of teeth of the second gear divided by a number of teeth of the first gear.

In some implementations of the present technology, the gear ratio is 1:3.

In some implementations of the present technology, a manual start assembly operatively connected to the second flywheel.

In some implementations of the present technology, the manual start assembly has: a rope spool connected to and coaxial with the second flywheel, a rope at least partially wound around the rope spool, and a handle connected to the rope. The rope spool, the rope and the handle form at least part of a rope-start system of the engine assembly.

In some implementations of the present technology, the second flywheel axis is parallel to and offset from the first flywheel axis.

In some implementations of the present technology, the crankshaft axis and the first flywheel axis are coaxial.

In some implementations of the present technology, the first flywheel axis extends through the crankcase and the second flywheel axis extends through the cylinder block.

In some implementations of the present technology, a rotary electrical generator operatively connects to the crankshaft. The rotary electrical generator includes a stator and a rotor rotating relative to the stator. The first flywheel includes the rotor.

In some implementations of the present technology, the rotor at least partially surrounds the stator.

In some implementations of the present technology, the second flywheel rotates faster than the first flywheel.

In some implementations of the present technology, the second flywheel rotates three times faster than the first flywheel.

In some implementations of the present technology, a radius of the second flywheel is greater than a radius of the first flywheel.

In some implementations of the present technology, a mass of the second flywheel is smaller than a mass of the first flywheel.

In some implementations of the present technology, a moment of inertia of the second flywheel is smaller than a moment of inertia of the first flywheel.

In some implementations of the present technology, an angular kinetic energy of components of the engine assembly turning in the second direction is generally equal to an angular kinetic energy of components of the engine assembly turning in the first direction when the first and second flywheels are rotating. The components of the engine assembly turning in the first direction include at least the crankshaft and the first flywheel. The components of the engine assembly turning in the second direction include at least the second flywheel.

According to another aspect of the present technology, there is provided a marine outboard engine having a cowling, the internal combustion engine assembly according to any one of the above aspect and implementations disposed at least in part in the cowling, a driveshaft operatively connected to and driven by the crankshaft, a propeller shaft operatively connected to and driven by the driveshaft, and a propeller connected to and driven by the propeller shaft.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The internal combustion engine assembly 100 will be described herein as being provided in a marine outboard engine 10 used to propel a watercraft. It is contemplated that the internal combustion engine assembly 100 could be used in other vehicles such as, but not limited to, snowmobiles, all-terrain vehicles (ATVs), and scooters, and in other applications such as, but not limited to, electric generators, lawnmowers and other small engine applications.

Figure 1:
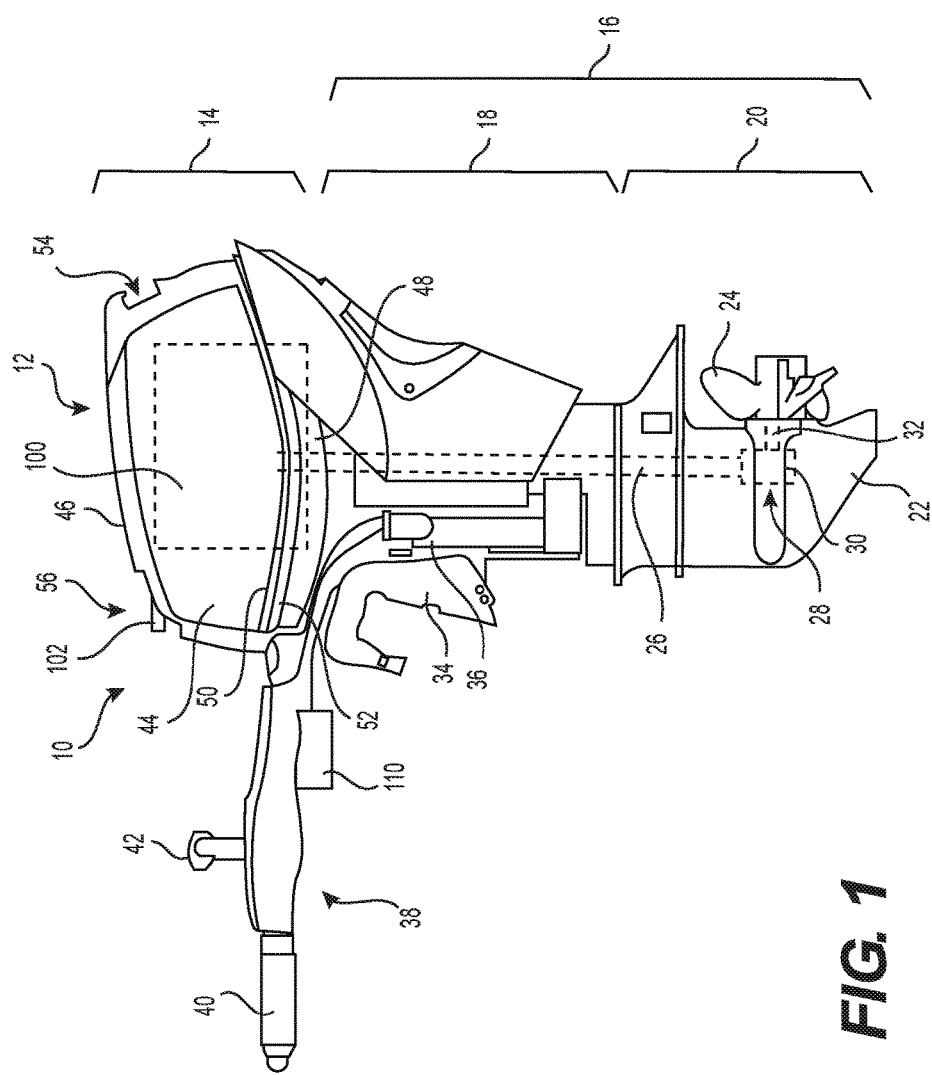
FIG. 1 is a left side elevation view of a marine outboard engine shown in an upright position.
Figure 2:
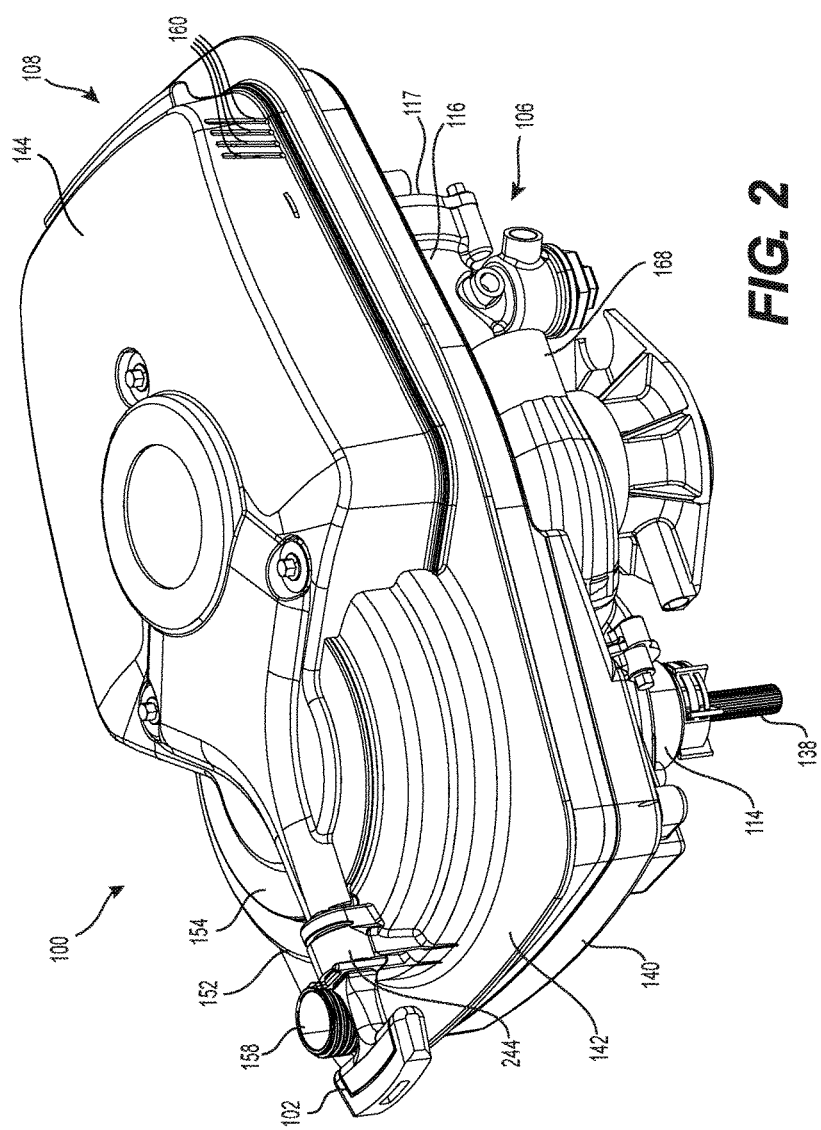
FIG. 2 is a perspective view, taken from a front, left side of an internal combustion engine assembly of the marine outboard engine of FIG. 1.

With reference to FIG. 1, the marine outboard engine 10 has a cowling 12. The marine outboard engine 10 includes a top portion 14 and a bottom portion 16. The bottom portion 16 includes a mid-section 18, a gear case assembly 20, a skeg portion 22 and a propeller 24.

The cowling 12 surrounds and protects the engine assembly 100 housed within the cowling 12. The engine assembly 100 will be described in greater detail below. The engine assembly 100 is operatively connected to a vertically oriented driveshaft 26 disposed in the cowling 12. The driveshaft 26 is coupled to a drive mechanism 28, which includes a transmission 30, a propeller shaft 32 and the propeller 24. The propeller 24 is mounted on the propeller shaft 32 which is driven by the transmission 30. The propeller shaft 32 is disposed in part in the gear case assembly 20 and is generally perpendicular to the driveshaft 26. The driveshaft 26 and the drive mechanism 28 are housed in part within the gear case assembly 20 of the bottom portion 16, and transfer power from the engine assembly 100 to the propeller 24 mounted on the rear side of the gear case assembly 20 of the outboard engine 10. The propulsion system of the outboard engine 10 could also include a jet propulsion device, turbine or other known propelling device.

A stern bracket 34 and a swivel bracket 36 are used to mount the outboard engine 10 to a watercraft. The stern bracket 34 is attached to the watercraft and can take various forms, the details of which are conventionally known. The swivel bracket 36 is pivotally connected to the stern bracket 34 such that the angle of outboard engine 10 relative to the watercraft may be changed in order to steer the watercraft.

In the implementation shown in FIG. 1, a tiller 38 is operatively connected to the swivel bracket 36 and extends forward of the cowling 12 to provide a lever used for manually steering of the outboard engine 10. The tiller 38 is rotatably fastened to the swivel bracket 36 such that it can be raised for ease of handling and transportation. The tiller 38 includes a handle 40 in the form of a twist grip used as throttle control as in most conventional small marine outboard engines. The tiller 38 also includes a shift lever 42 for selecting a forward, neutral or reverse gear of the transmission 30. It is contemplated that the tiller 38 could be omitted and that the outboard engine 10 could be steered using a steering wheel connected to a hydraulic or electric steering system and that the throttle of the engine assembly 100 and the position of the transmission 30 could be controlled by one or more levers disposed near the steering wheel.

The cowling 12 includes an upper motor cover assembly 44 with a top cap 46, and a lower motor cover 48. The upper motor cover assembly 44 encloses a top portion of the engine assembly 100. The lower motor cover 48 surrounds the remainder of the engine assembly 100 and the exhaust system (not shown). The mid-section 18 extends from the lower motor cover 48 to the gear case assembly 20 and includes the lower half of the lower motor cover 48. The gear case assembly 20 encloses the transmission 30 and supports the drive mechanism 28 in a known manner.

The upper motor cover assembly 44 and the lower motor cover 48 are made of sheet material, such as plastic, but could also be made of metal, composite or the like. The lower motor cover 48 and/or other components of the cowling 12 can be formed as a single piece or as several pieces. For example, the lower motor cover 48 can be formed as two lateral pieces mating along a vertical joint. The lower motor cover 48, which is also made of sheet material, such as plastic, but could also be made of metal, composites or the likes. One suitable composite is a sheet molding compound (SMC) which is typically a fibreglass reinforced sheet molded to shape.

A lower edge 50 of the upper motor cover assembly 44 mates in a sealing relationship with an upper edge 42 of the lower motor cover 48. A seal is disposed between the lower edge 50 of the upper motor cover assembly 44 and the upper edge 52 of the lower motor cover 48 to form a watertight connection. One or more locking mechanisms (not shown) are provided on at least one of the sides and/or at the front and/or back of the cowling 12 to lock the upper motor cover assembly 44 onto the lower motor cover 48.

Figure 5:
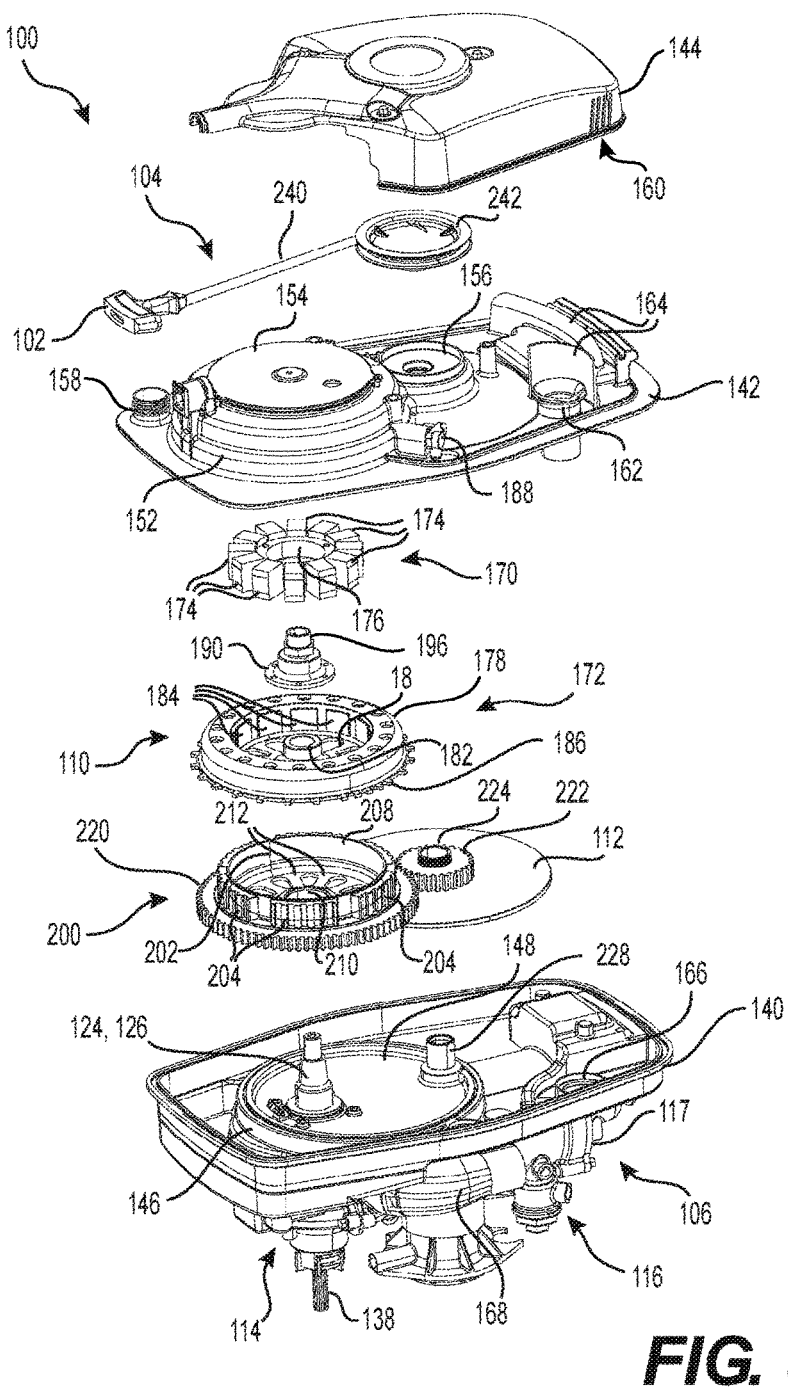
FIG. 5 is a partially exploded view of the engine assembly of FIG. 2.

The upper motor cover assembly 44 is formed in two parts, but could also be a single part. The upper motor cover assembly 44 includes an air intake portion 54 formed as a recessed portion on the rear of the cowling 12. The air intake portion 54 is configured to allow the entry of air but prevent the entry water into the interior of the cowling 12 and then into the engine assembly 100. Such a configuration can include a tortuous path for example. The top cap 46 defines a portion of the air intake portion 54. It is contemplated that the air intake portion could be defined elsewhere on the cowling 12. The top cap 46 also defines a recess 56 in which a handle 102 of a manual start assembly 104 (FIG. 5) is received.

Turning now to FIGS. 2 to 10, the engine assembly 100 will be described in more detail. The engine assembly 100 includes an internal combustion engine 106, a housing 108 mounted to the engine 106, a magneto 110, a flywheel 112 and the manual start assembly 104. The magneto 100, the flywheel 112 and the manual start assembly 104 are disposed in the housing 108 as will be discussed in more detail below.

Figure 3:
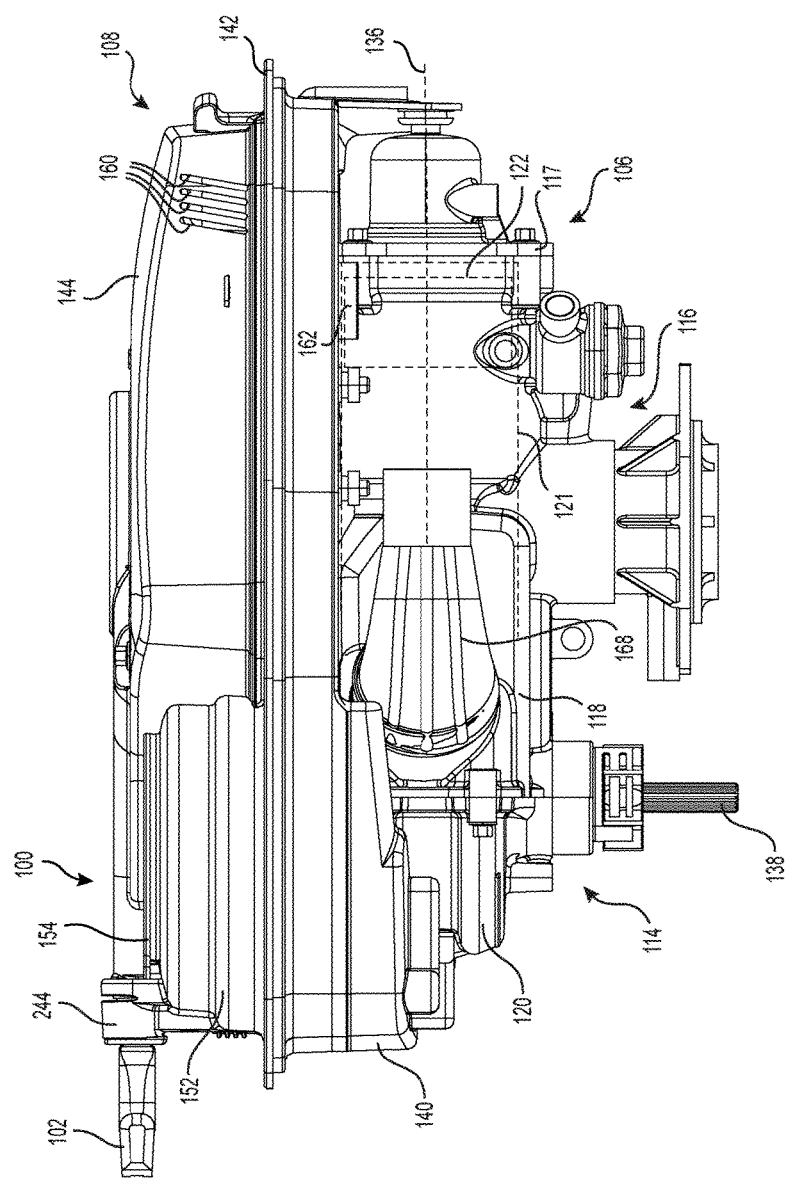
FIG. 3 is a left side elevation view of the engine assembly of FIG. 2.
Figure 4:
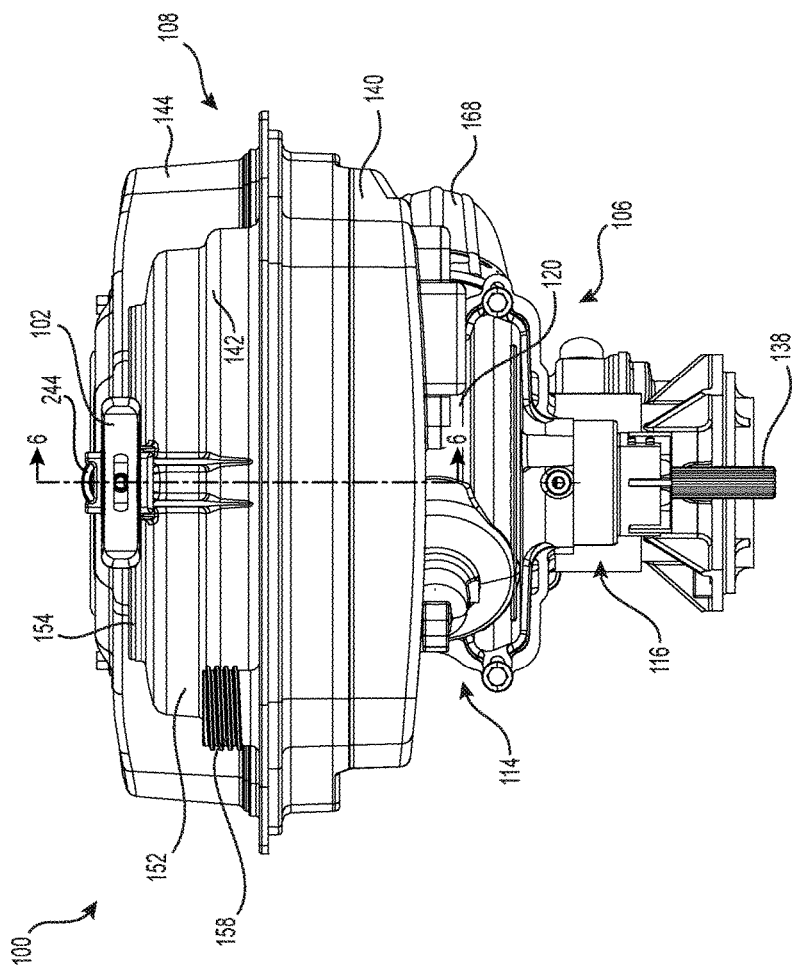
FIG. 4 is a front elevation view of the engine assembly of FIG. 2.

The engine 105 is a two-stroke, direct injected internal combustion engine. It is contemplated that other types of engines, such as engines operating on the four-stroke principle or carbureted engines for example, could be used. As best seen in FIG. 3, the engine 106 has a crankcase 114, a cylinder block 115 and a cylinder head 117.

One portion 118 of the crankcase 114 is integrally formed with the cylinder block 116. Another portion 120 of the crankcase 114 is formed separately from the cylinder block 115 and is fastened to the portion 118 of the crankcase 114. The cylinder block 116 defines a single cylinder 121 (shown in dotted lines in FIG. 3). A single piston 122 (shown in dotted lines in FIG. 3) is disposed in the cylinder 121. It is contemplated that the cylinder block 116 could define more than one cylinder 121 in which case a corresponding number of pistons 122 would be provided. The cylinder block 115 and the portions 118, 122 are made by a metal casting process, but other processes are contemplated. The cylinder head 117 is fastened to the end of the cylinder block 116.

Figure 10:
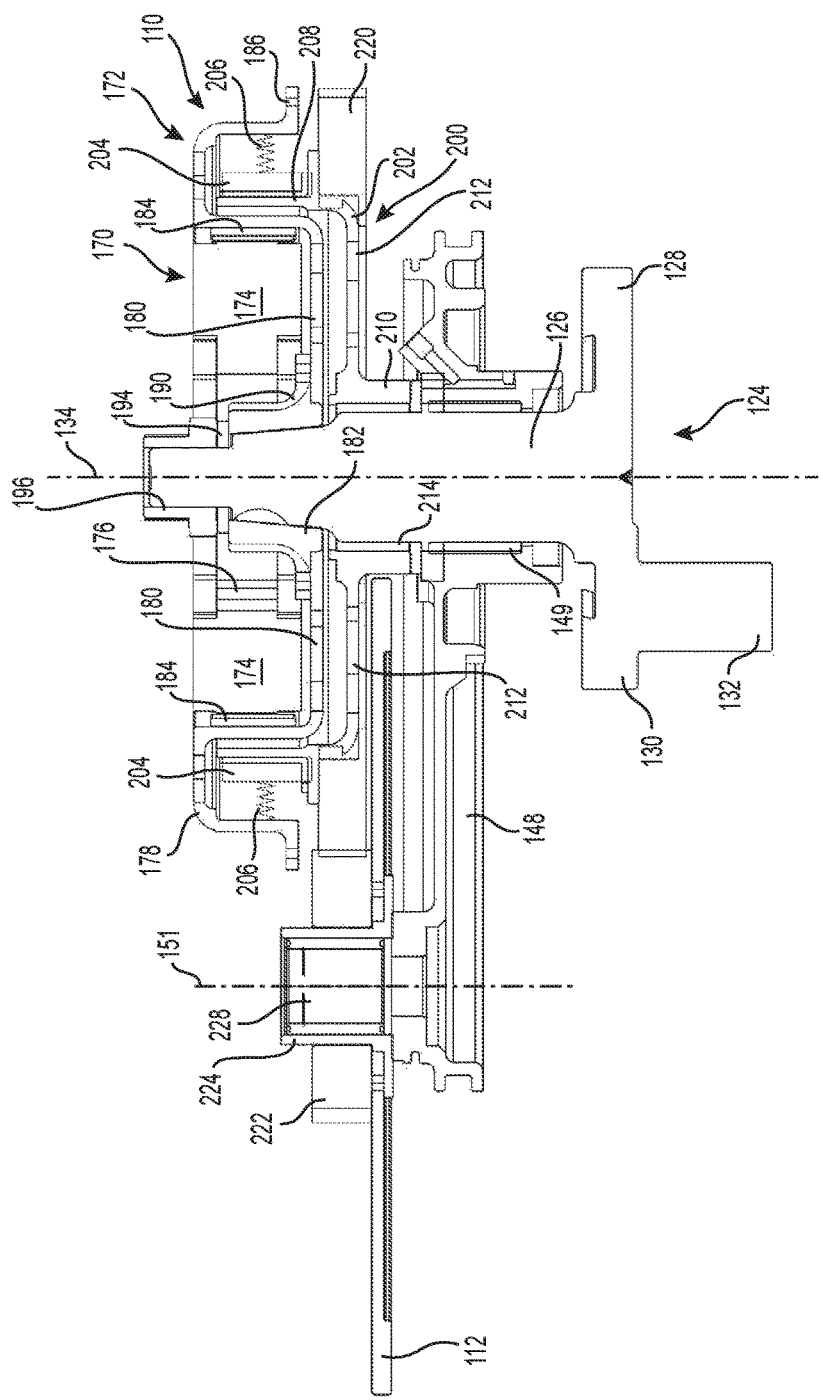
FIG. 10 is a cross-sectional view of the flywheel assembly of the engine assembly of FIG. 2 taken through line 6-6 of FIG. 4.

A crankshaft 124 is housed in part in the crankcase 114. Note that only a portion of the crankshaft 124 is shown in the figures. As best seen in FIG. 10, the crankshaft 124 includes an output shaft 126, a counterweight 128, a web 130 and a crankpin 132. The output shaft 126 protrudes from the crankcase 114. Bearings (not shown) disposed between the output shaft 126 and the crankcase 114 permit the rotation of the crankshaft 124 about a crankshaft axis 134 corresponding to a central axis of the output shaft 126. The counterweight 128 and the web 130 are connected to a base of the output shaft 126 inside the crankcase 114. The crankpin 132 is connected to the web 130 and is offset from the crankshaft axis 134 (FIG. 10). A connecting rod (not shown) connects the crankpin 132 to the piston 122. Reciprocation of the piston 122 along a central axis of the cylinder 121, referred to herein as the cylinder axis 136 (FIG. 3), causes the crankshaft 124 to rotate about the crankshaft axis 134. The end of the crankpin 132 opposite the end connected to the web 130 is connected to a crank disk (not shown) which also forms part of the crankshaft 124. The crank disk is connected to a splined shaft 138 that is coaxial with the output shaft 126. The splined shaft 138 is connected to the driveshaft 26 such that the engine 106 can drive the driveshaft 26. It is contemplated that the crank disk could be replaced by a second counterweight and web. It is also contemplated that the driveshaft 26 could be connected to the crankshaft 124 in a manner other than the one described above.

The housing 108 includes a lower cover 140, an intermediate cover 142 and an upper cover 144. In the present implementation, the lower cover 140, the intermediate cover 142 and the upper cover 144 are made of plastic, but it is contemplated that other material, such as fiberglass or other composites for example, could be used. It is contemplated that the upper motor cover assembly 44 and the lower motor cover 48 could be omitted such that the housing 108 is exposed.

The lower cover 108 is fastened to the crankcase 114 and the cylinder block 116. The lower cover 108 has an inner circular lip 146 defining a circular aperture. A disk 148 is disposed in this aperture and is fastened to the crankcase 114. In the present implementation, the disk 148 is made of metal, but it is contemplated that it could be made of other materials. The output shaft 126 of the crankshaft 114 passes through the disk 148. A bearing 149 (FIG. 6) is disposed between the disk 148 and the output shaft 126 to rotatably support the crankshaft 124 in the disk 148. A shaft 150 (FIG. 6) is connected to the disk 148 at a position offset from the output shaft 126 of the crankshaft 124. In the present implementation, an axis 151 (FIG. 10) of the shaft 150 is parallel to the crankshaft axis 134 and is contained in a plane defined by the crankshaft axis 134 and the cylinder axis 136. The magneto 110 includes a rotor 172 that is mounted to the output shaft 126 above the disk 148 as will be described in more detail below. The flywheel 112 is mounted to the shaft 150 above the disk 148 as will be described in more detail below.

The intermediate cover 142 is mounted on top of the lower cover 140. As such, the magneto 110 and the flywheel 112 are disposed between the lower cover 140 and the intermediate cover 142. The intermediate cover 142 has a circular lip 152 surrounding the magneto 110. A circular plate 154 is connected to the intermediate cover 142 and closes the aperture defined by the lip 152. In the present implementation, the circular plate 154 is made of metal, but it is contemplated that it could be made of other materials. The intermediate cover 142 also defines a protrusion 156 having an aperture to receive components associated with the flywheel 112 that will be described below. The intermediate cover 142 also defines an oil filler neck 158 near a front, right corner thereof. The oil filler neck 158 is selectively closed by an oil cap (not shown). Oil poured through the oil filler neck 158 falls in the oil pan defined by the lower cover 140 around the lip 146. The manual start assembly 104 is mounted above the intermediate cover 142. The upper cover 144 is fastened on top of the intermediate cover 142. The manual start assembly 104, except for the handle 102, is disposed between the intermediate cover 142 and the upper cover 146.

Air to be supplied to the engine 106 first enters through the air intake portion 54 of the cowling 12. The air then passes through slits 160 defined on the rear sides of the upper cover 144. It is contemplated that openings in the intermediate and/or upper covers 142 and 144 other than the slits 160 could be used, either alone or in combination with the slits 160. Once inside the upper cover 144, the air flows through a tube 162 defined by the intermediate cover 142. Baffles 164 defined by the intermediate cover 142 are disposed between the slits 160 and the tube 162. The baffles 164 create a tortuous path for the air, thereby helping to prevent water from entering the tube 162. The tube 162 extends through an aperture 166 defined in the lower cover 140 and extends below the lower cover 140 as can be seen in FIG. 3. The tube 162 is connected to an air intake pipe 168 of the engine 106 by a pipe and an air filter (both not shown). The air intake pipe 168 supplies the air inside the crankcase 114 which is then supplied to the combustion chamber defined by the cylinder 121, the piston 122 and the cylinder head 117. The air in the combustion chamber is mixed with fuel for combustion. Exhaust gases resulting from the combustion process in the combustion chamber are supplied to the exhaust system (not shown) which, as explained above, is housed at least in part in the lower motor cover 48.

Turning now to FIGS. 5, 6 and 8 to 10, a connection of the magneto 110 to the crankshaft 124 will be described in more detail. The magneto 110 is a rotary electrical generator that generates current to be used to power various components of the outboard engine 10. It is contemplated that the magneto 110 could also be used to recharge batteries located in the boat to which the outboard engine 10 is attached. These batteries can be used to power components of the boat and/or to provide power to the outboard engine 10. It is also contemplated that the magneto 110 could also be used to power components of the boat directly. It is contemplated that a rotary electrical generator other than the magneto 110 could be provided. For example, an alternator could be provided instead of the magneto 110.

Figure 8:
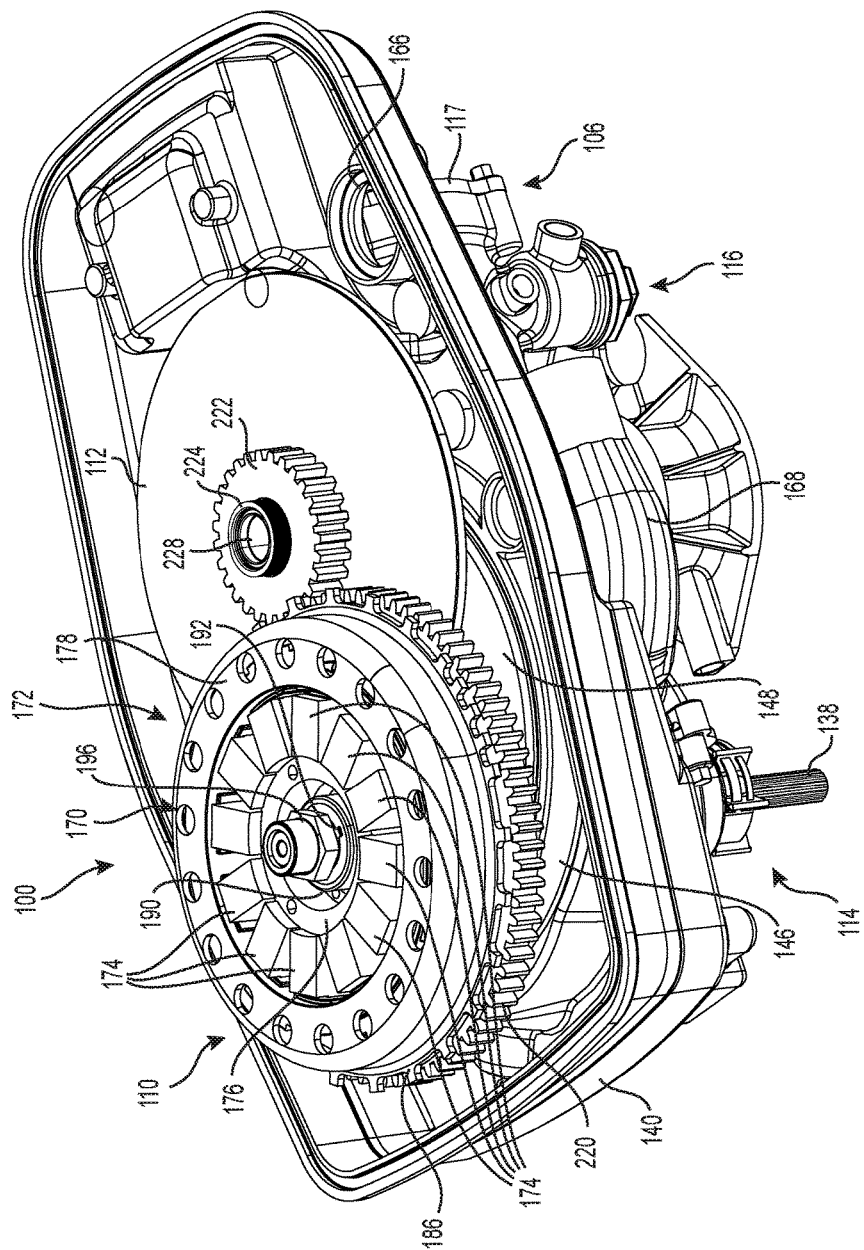
FIG. 8 is a perspective view, taken from a front, left side, of the engine assembly of FIG. 2 with the cover and a housing panel removed.
Figure 9:
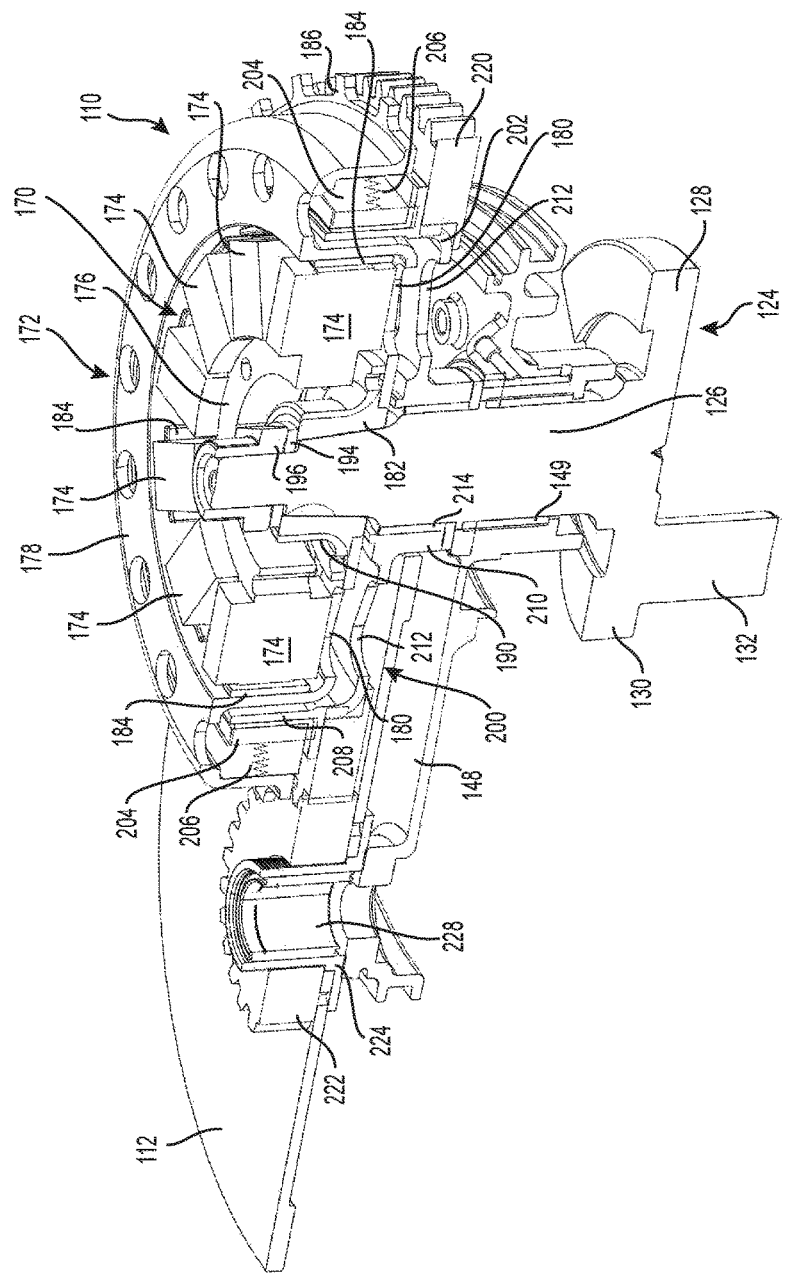
FIG. 9 is a perspective view taken from a front, right side of a cross-section of a flywheel assembly of the engine assembly of FIG. 2 taken through line 6-6 of FIG. 4.

The magneto 110 includes a stator 170 and the rotor 172. The stator 170 includes a number of field coils 174 (only some of which are labeled for clarity) arranged in a circle and connected to a central ring 176. The central ring 176 is fastened to the circular plate 154. The rotor 172 includes an annular portion 178 connected by a number of webs 180 to a central hub 182. A number of permanent magnets 184 (only some of which are labeled for clarity) are connected to an inner surface of the annular portion 178 of the rotor 172 so as to be positioned radially between the annular portion 178 and the field coils 174. The central hub 182 is connected to the crankshaft 124 as will be described below such that the rotor 172 rotates with the crankshaft 124. As they rotate with the crankshaft 124 and due their inertia, the rotor 172 with the magnets 184 form a flywheel of the engine assembly 100. The rotor 172 rotates about a flywheel axis (or rotor axis) corresponding to the crankshaft axis 134 and which extends through the crankcase 114. As such, the crankshaft axis 134 will also be referred to herein as the flywheel axis 134. As best seen in FIGS. 8 to 10, the stator 170 is disposed in the annular cavity defined between the crankshaft 124 and the annular portion 178 of the rotor 172 such that the rotor 172 at least partially surrounds the stator 170. A ring of teeth 186 is connected to the periphery of the annular portion 178 of the rotor 172. An engine speed sensor 188 mounted to the intermediate cover 142 senses the pattern of teeth of the ring of teeth 186 as the rotor 172 rotates to generate a signal representative of engine speed that is sent to a control unit (not shown) of the engine assembly 100.

Figure 6:
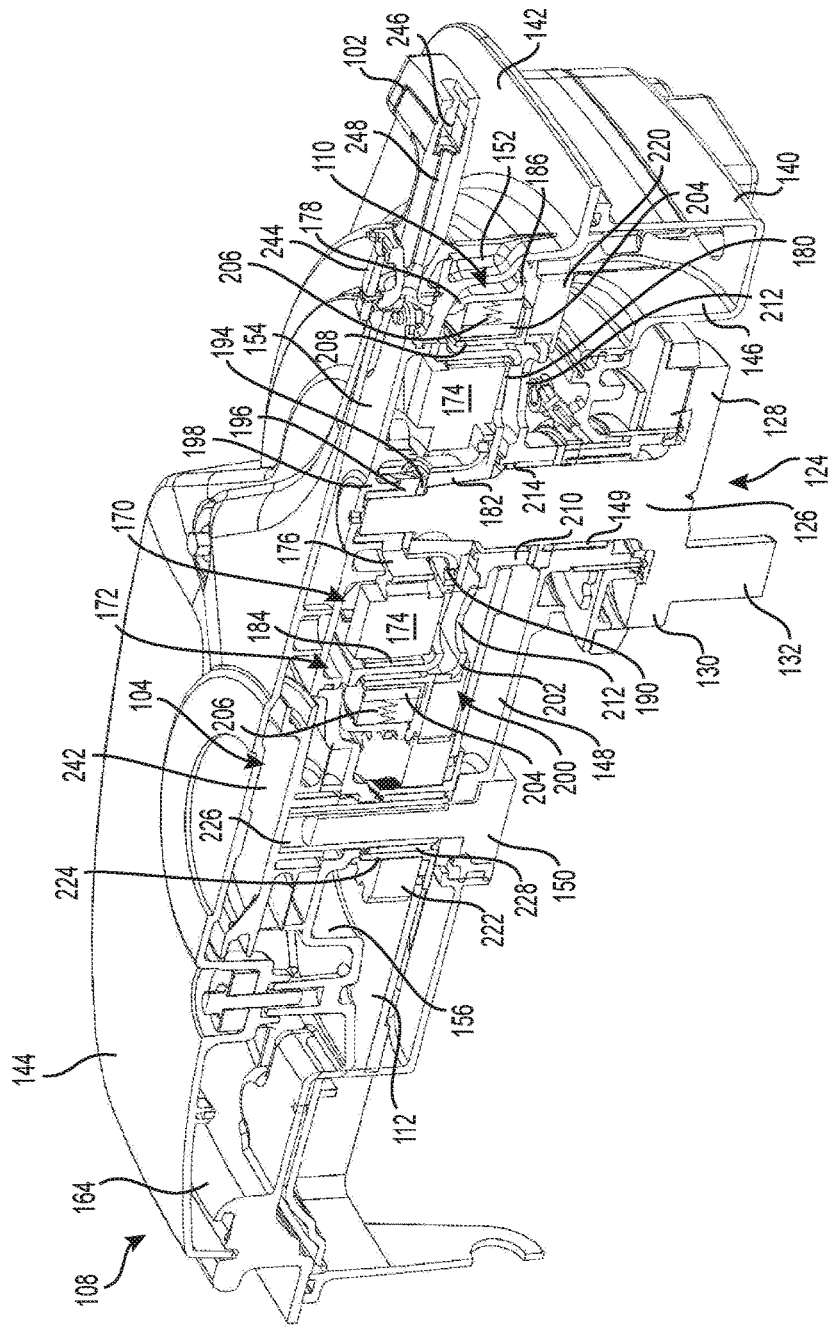
FIG. 6 is a perspective view taken from a front, right side of a cross-section of upper components of the engine assembly of FIG. 2 taken through line 6-6 of FIG. 4.

To fasten the rotor 172 to the crankshaft 124, a flanged collar 190 is fastened to the rotor 172 around the central hub 182. A tapered portion of the output shaft 126 of the crankshaft 124 defines a key (not shown). The flanged collar 190 defines a corresponding keyway 192 (FIG. 8). The flanged collar 180 is disposed over the tapered portion of the output shaft 126 such that the key is received in the keyway 192, thereby preventing rotation of the collar 190, and therefore the rotor 172, relative to the crankshaft 124. It is contemplated that the key and keyway 192 could be replaced by other means of preventing relative rotation of the collar 190 relative to the crankshaft 124. For example, the tapered portion of the output shaft 126 and the collar 190 could be splined or could each have corresponding flat surfaces. A washer 194 (FIG. 9) is disposed around the output shaft 126 over the collar 190 and a nut 196 is fastened to a threaded portion of the output shaft 126 over the washer 194, thereby retaining the rotor 172 onto the crankshaft 124. As best seen in FIG. 8, the upper portion of the nut 196 is cylindrical. As can be seen in FIG. 6, this cylindrical portion of the nut 196 is received inside a circular lip 198 defined by the underside of the circular plate 154, thus acting as a journal bearing for the end of the crankshaft 124.

In addition to the flywheel formed by the rotor 172 and magnets 184 of the magneto 110, the engine assembly 100 has another flywheel 112, as previously mentioned. The flywheel 112 is driven by the crankshaft 124 via the rotor 172 of the magneto 110 and a clutch 200. The clutch 200 includes a clutch rotor 202, a plurality of clutch pads 204 and springs 206. The clutch rotor 202 has an outer ring 208 mounted to a central hub 210 by a plurality of webs 212 (only some of which are labeled for clarity). The central hub 210 is mounted to the output shaft 126 of the crankshaft 124 by a bearing 214 such that the crankshaft 124 can rotate relative to the clutch rotor 202 when the clutch 200 is not engaged. As can be seen in FIG. 10, the central hub 210 of and the webs 212 of the clutch rotor 202 are disposed below the central hub 182 and the webs 180 of the rotor 172 of the magneto 110 respectively. The outer ring 208 of the clutch rotor 202 is received in the annular portion 178 of the rotor 172 of the magneto 110. As can also be seen in FIG. 10, the stator 170 and rotor 172 of the magneto 110, the clutch rotor 202 and the crankshaft 124 are coaxially arranged about the crankshaft axis 134. The clutch pads 204 are disposed about the outer ring 208 of the clutch rotor 202 radially between the outer ring 208 and the outer wall of the annular portion 178 of the rotor 172 of the magneto 110. The springs 206 are connected between the inner face of the outer wall of the annular portion 178 of the rotor 172 of the magneto 110 and the clutch pads 204 to bias the clutch pads 204 against the outer ring 208 of the clutch rotor 202. Each clutch pad 204 is biased toward the outer ring 208 by more than one spring 206, but it is contemplated that only one spring 206 per clutch pad 204 could be used or that the clutch pads 204 could be biased in another way.

When the crankshaft 124 turns the rotor 172 of the magneto 110 at low speed, the springs 206 bias the clutch pads 204 against the outer ring 208 of the clutch rotor 202 and the friction between the clutch pads and the outer ring 208 cause the clutch rotor 202 to rotate with the rotor 172 of the magneto 110. In this configuration, the clutch 200 is said to be engaged. As the crankshaft 124 turns the rotor 172 of the magneto 110 faster, the clutch pads 204 push against the springs 206 radially outwardly, eventually overcoming the biasing forces of the springs 206. As a result, the clutch pads 206 move away from the outer ring 208 of the clutch rotor 202 and the clutch rotor 202 stops being driven by the rotor 172 of the magneto 110. The clutch rotor 202 continues to turn due to inertia, but friction inside the mechanism will eventually cause it to stop turning unless the clutch 200 is engaged again. When the clutch pads 204 move away from the outer ring 208 of the clutch rotor 202, the clutch 200 is said to be disengaged. The speed of rotation of the crankshaft 124, which corresponds to the engine speed, at and below which the clutch 200 is engaged is referred to herein as the clutch engagement speed. In one implementation, the clutch engagement speed is a speed between 2000 and 2500 revolutions per minutes, but other engagement speeds are contemplated. It is contemplated that other types of clutches could be used instead of the clutch 200 described above.

A ring gear 220 is connected the outer circumference of the clutch rotor 202 at a base thereof so as to rotate with the clutch rotor 202. The ring gear 220 engages a gear 222 that is connected to and coaxial with the flywheel 112 as will be described below. When the engine 106 is operating at speeds at or below the clutch engagement speed such that the clutch 200 is engaged, the crankshaft 124 drives the rotor 172 of the magneto 110, which drives the clutch rotor 172 and as a result the ring gear 220, and the ring gear 220 drives the gear 222 which drives the flywheel 112. The gear 222 and the flywheel 112 rotate in a direction opposite to the direction of rotation of the crankshaft 124, the rotor 172 of the magneto 110, the clutch rotor 172 and the ring gear 220. As can be seen, the ring gear 220 has a larger diameter and more teeth than the gear 222. As a result, the gear ratio of the gears 220 and 222 is less than one. The gear ratio corresponds to the number of teeth of the gear 222 divided by the number of teeth of the ring gear 220. As a result of this gear ratio, the gear 222 rotates faster than the ring gear 220. Therefore, the flywheel 112 rotates faster than the flywheel formed by the rotor 172 and magnets 184 of the magneto 110 when the engine 106 is operating and the clutch 200 is engaged. In the present implementation, the gear ratio is 1:3 and as a result the flywheel 112 rotates three times faster than the flywheel formed by the rotor 172 and magnets 184 of the magneto 110 when the engine 106 is operating and the clutch 200 is engaged. Other gear ratios are contemplated. When the engine speed exceeds the clutch engagement speed and the clutch 200 is disengaged, the flywheel 112 continues to turn due to inertia, but friction inside the mechanism will eventually cause it to stop turning unless the clutch 200 is engaged again. It is contemplated that the gears 220, 222 could be replaced by other drive mechanisms such as, but not limited to, belt and pulleys or chain and sprockets assemblies. In an alternative implementation, it is contemplated that the clutch 200 could be omitted and that the ring gear 220 could be mounted to the rotor 172 of the magneto 110 such that the flywheel 112 is always driven by the crankshaft 124 via the rotor 172.

As can be seen in FIGS. 6, 9 and 10, the gear 222 is threaded onto a flanged collar 224. The flywheel 112 is disposed around the flanged collar 224 and rests on the flange of the flanged collar 224. The flywheel 112 is fastened to the flange of the flanged collar 224. As can be seen, the flywheel 112 is a disk disposed between the flange of the flanged collar 224 and the gear 222. A hollow shaft 226 (FIG. 6) is disposed inside the flanged collar 224. The hollow shaft 226 is connected to the flanged collar 224 by an one-way bearing 228, such as a sprag clutch, disposed radially between the hollow shaft 226 and the flanged collar 224. The hollow shaft 226 is rotationally connected to the shaft 150 by the one-way bearing 228 (FIG. 6) such that the shaft 226, the ring 228, the collar 224, the gear 222 and the flywheel 112 can rotate relative to the shaft 150 about the axis 151. As the flywheel 112 rotates about the axis 151, the axis 151 will also be referred to herein as the flywheel axis 151. The flywheel axis 151 is parallel to and offset from the flywheel axis 134 as can be seen in FIG. 10. The flywheel axis 151 is located so as to extend through the cylinder block 116. In the present implementation, the flywheel axis 151 extends through the cylinder block 116 at a position that is between a cylinder head facing side of the piston 122 at the top dead center position of the piston 122 and the cylinder head facing side of the piston 122 at the bottom dead center position of the piston 122 in a direction corresponding to the cylinder axis 136. In one implementation, the flywheel axis 151 extends at a position that is halfway between the top dead center and bottom dead center positions of the piston 122. In the present implementation, the flywheel axis 151 intersects the cylinder axis 136. As can be seen, the portion of the flywheel 112 disposed between the flywheel axes 151 and 134 is disposed under the magneto 110 and the clutch 200. As a result, this portion of the flywheel 112 is disposed between the rotor 172 of the magneto 110 and the crankcase 114 and cylinder block 116 of the engine 106.

The flywheel 112 is thinner and has a larger radius than the rotor 172 of the magneto 110 which, as explained above, also forms a flywheel. The flywheel 112 also has a smaller mass than the flywheel formed by the rotor 172 and magnets 184 of the magneto 110. Due to its mass and shape, in the present implementation, the moment of inertia of the flywheel 112 is smaller is smaller than the moment of inertia of the flywheel formed by the rotor 172 and magnets 184 of the magneto 110.

Figure 7:
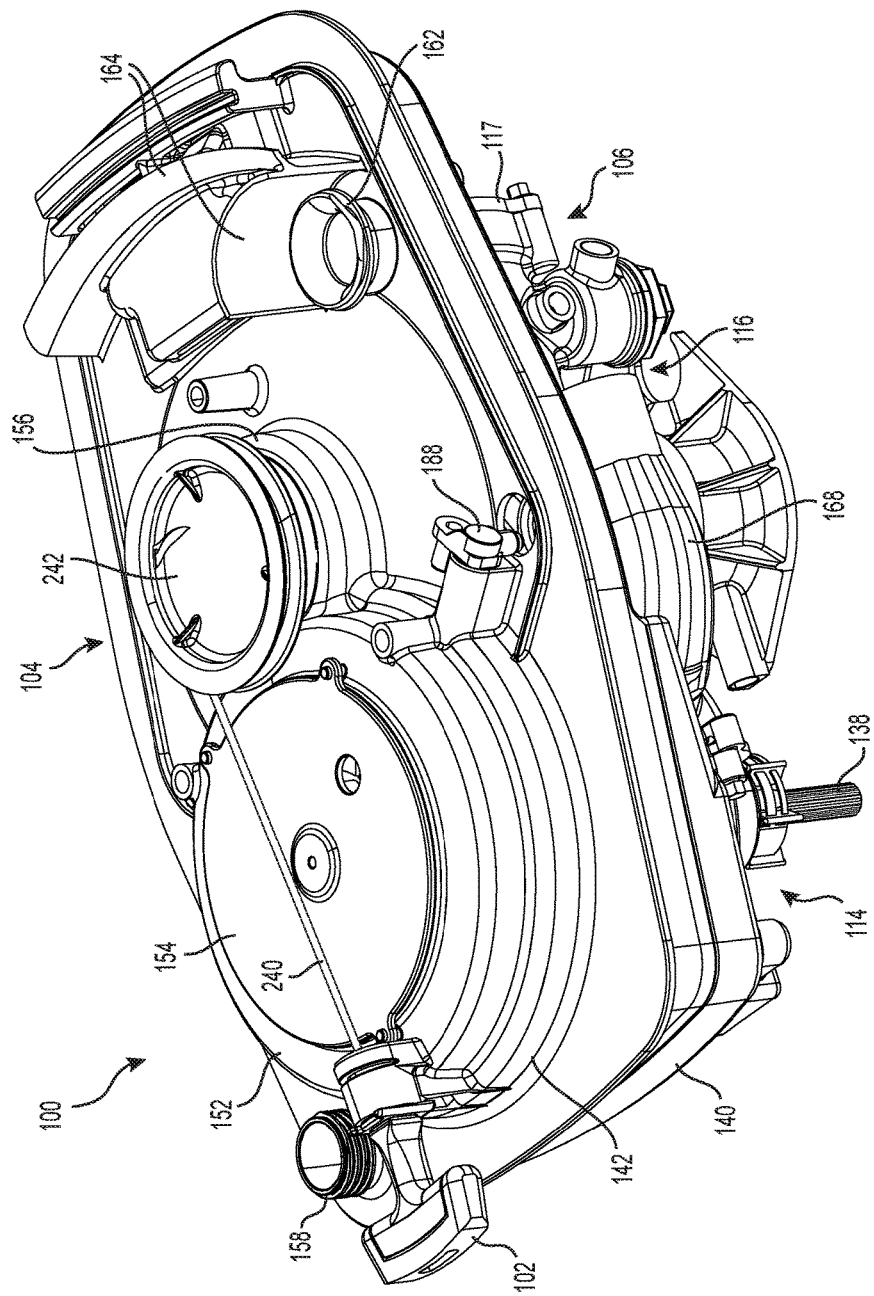
FIG. 7 is a perspective view, taken from a front, left side, of the engine assembly of FIG. 2 with a cover removed.

With reference to FIGS. 6 and 7, the manual start assembly 104 will be described in more detail. The manual start assembly 104 includes the handle 102, a rope 240, a rope spool 242 and the one-way bearing 228. These form what is commonly referred to as a rope-start system. When the handle 102 is not being pulled to start the engine 106, an end of the handle 102 rests inside a flared end of a tube 244 connected to the intermediate cover 142. A knotted end of the rope 240 is disposed inside a chamber 246 (FIG. 6) and passes through a passage 248 (FIG. 6) both defined in the handle 102 so as to connect the rope 240 to the handle 102. From the handle 102, the rope 240 passes through the tube 244 and is wound around the rope spool 242. The end of the rope 102 is securely fastened to the rope spool 242. The rope spool 242 is operatively connected to the shaft 226 by the one-way bearing 228. It is contemplated that other types of manual start assemblies 104 could be used. It is also contemplated that the manual start assembly 104 could be replaced by an automatic start assembly. For example, an automatic start assembly could include an electric starter motor.

To start the engine 106 using the manual start assembly 104, a user of the outboard engine 10 pulls the handle 102 which causes the rope 240 to unwind from the rope spool 242 thereby turning the rope spool 242. The one-way bearing 228 engages the shaft 226 thereby causing the rope spool 242 to turn the flywheel 112. As the clutch 200 is engaged, the rotation of the flywheel 112 turns the rotor 172 of the magneto 110 via the gears 222, 220 and the clutch 200. The rotation of the rotor 172 of the magneto 110 causes rotation of the crankshaft 124, which results in displacement of the piston 122 inside the cylinder 121. The resulting compression inside the combustion chamber should allow for a first combustion event to occur, thereby starting the engine 106. When the user releases the handle 102, a spring mechanism (not shown) turns the rope spool 242 so as to wind the rope 240 around the rope spool 242 and to return the handle 102 to the position shown in the figures. Once the engine 106 is operating and when the flywheel 112 is turning, the one-way bearing 228 prevents the shaft 226 from driving the rope spool 242.

When the clutch 200 is engaged, the combined rotating masses rotating about the axis 151 and the axis 134 help smooth out the impulses created during the combustion cycle of the engine 106 in the same manner in which a single larger and/or heavier flywheel would, although within an advantageously smaller footprint given the overlapping arrangement of these two sets of masses, in particular the flywheel 112 and the magneto 110. In addition, the total mass of the combined system of the illustrated embodiment can be less than that of a conventional single flywheel because the ratio of the gears 220 and 222 causes the flywheel 112 to rotate faster than the masses that rotate with the crankshaft 124. As such, the inertial effect of the flywheel 112 is greater than if it were rotating at the same speed as the crankshaft 124. Moreover, the reaction forces at the contact point between the gears 220 and 222 generates a force through the flywheel axis 151 that create a couple that opposes the couple created by the cylinder side wall force, thereby reducing the NVH of the engine 106. Accordingly, since the generated couple depends in part on the moment arm resulting from the position of the flywheel axis 151, in order to effectively reduce the NVH of the engine 106, the exact position of the flywheel axis 151 is determined according to the geometry of the cylinder 121, of the piston 122, of the crankshaft 124 and of the connecting rod and according to the operating parameters of the engine 106 as these determine the cylinder wall forces.

In the present implementation, the size, shape, dimension and gear ratio of the gears 220, 222 are selected such that the angular kinetic energy of the flywheel 112 and the components of the engine assembly 100 that turn in the same direction as the flywheel 112 is generally equal to the angular kinetic energy of the components of the engine assembly 100 that turn in the opposite direction. A difference of more or less than ten percent is considered a corresponding to generally equal kinetic energies herein. In one implementation, the kinetic energies are within five percent of each other. As would be understood from the above description of the engine assembly 100, the components that turn in the same direction as the flywheel 112 include, but are not limited to, the gear 222, the collar 224, the ring 228 and the shaft 226, and the components that turn in the direction opposite to the flywheel 112 include, but are not limited to, the crankshaft 124, the rotor 172, the permanent magnets 184, the ring of teeth 186, the collar 190 and the ring gear 220. It is contemplated that the size, shape, dimension and gear ratio of the gears 220, 222 could be selected such that the angular kinetic energy of the flywheel 112 and the components of the entire outboard engine 10 that turn in the same direction as the flywheel 112 is generally equal to the angular kinetic energy of the components of the entire outboard engine 10 that turn in the opposite direction, such as, but not limited to, the driveshaft 26.

The internal combustion engine assembly 100 implemented in accordance with some non-limiting implementations of the present technology can be represented as presented in the following numbered clauses.

CLAUSE 1. An internal combustion engine assembly comprising: a crankcase; cylinder block connected to the crankcase, the cylinder block defining at least one cylinder; t least one piston disposed in the at least one cylinder; crankshaft disposed at least in part in the crankcase and operatively connected to the at least one piston, the crankshaft rotating in a first direction about a crankshaft axis; flywheel operatively connected to and driven by the crankshaft, the flywheel rotating in a second direction opposite the first direction about a flywheel axis; and clutch selectively operatively connecting the crankshaft to the flywheel.

CLAUSE 2. The internal combustion engine assembly of clause 1, wherein the flywheel is disposed externally of the crankcase and the cylinder block.

CLAUSE 3. The internal combustion engine assembly of clause 1 or 2, wherein the clutch disconnects the flywheel from the crankshaft when the crankshaft rotates above a clutch engagement speed.

CLAUSE 4. The internal combustion engine assembly of any one of clauses 1 to 3, wherein the clutch is coaxial with the crankshaft and rotates in the first direction.

CLAUSE 5. The internal combustion engine assembly of any one of clauses 1 to 4, further comprising: a first gear connected to the clutch; and a second gear connected to the flywheel and coaxial with the flywheel, the second gear engaging the first gear.

CLAUSE 6. The internal combustion engine assembly of any one of clauses 1 to 5, further comprising a manual start assembly operatively connected to the flywheel.

CLAUSE 7. The internal combustion engine assembly of clause 6, wherein the manual start assembly comprises: a rope spool connected to and coaxial with the flywheel; a rope at least partially wound around the rope spool; and a handle connected to the rope, the rope spool, the rope and the handle forming at least part of a rope-start system of the engine assembly.

CLAUSE 8. The internal combustion engine assembly of any one of clauses 1 to 7, wherein the flywheel axis is parallel to and offset from the crankshaft axis.

CLAUSE 9. The internal combustion engine assembly of any one of clauses 1 to 8, wherein: the at least one cylinder is a single cylinder; and the at least one piston is a single piston.

CLAUSE 10. The internal combustion engine assembly of clause 1, wherein: the flywheel is a second flywheel; and the flywheel axis is a second flywheel axis; the internal combustion engine assembly further comprising a first flywheel operatively connected to and driven by the crankshaft, the first flywheel rotating in the first direction about a first flywheel axis; and wherein the second flywheel is operatively connected to and driven by the first flywheel.

CLAUSE 11. The internal combustion engine assembly of clause 10, wherein the first and second flywheels are disposed externally of the crankcase and the cylinder block on a same side of the crankcase and the cylinder block.

CLAUSE 12. The internal combustion engine assembly of clause 11, wherein at least a portion of the second flywheel is disposed between the first flywheel and at least one of the crankcase and the cylinder block.

CLAUSE 13. The internal combustion engine assembly of clause 11 or 12, wherein the clutch selectively operatively connects the first flywheel to the second flywheel.

CLAUSE 14. The internal combustion engine assembly of clause 13, wherein the clutch disconnects the first flywheel from the second flywheel when the crankshaft rotates above a clutch engagement speed.

CLAUSE 15. The internal combustion engine assembly of clause 13 or 14, wherein the clutch is coaxial with the crankshaft and the first flywheel, and rotates in the first direction.

CLAUSE 16. The internal combustion engine assembly of any one of clauses 13 to 15, further comprising: a first gear connected to the clutch; and a second gear connected to the second flywheel and coaxial with the second flywheel, the second gear engaging the first gear.

CLAUSE 17. The internal combustion engine assembly of clause 16, wherein a gear ratio of the first and second gears is less than one, the gear ratio corresponding to a number of teeth of the second gear divided by a number of teeth of the first gear.

CLAUSE 18. The internal combustion engine assembly of clause 17, wherein the gear ratio is 1:3.

CLAUSE 19. The internal combustion engine assembly of any one of clauses 13 to 18, further comprising a manual start assembly operatively connected to the second flywheel.

CLAUSE 20. The internal combustion engine assembly of clause 19, wherein the manual start assembly comprises: a rope spool connected to and coaxial with the second flywheel; a rope at least partially wound around the rope spool; and a handle connected to the rope, the rope spool, the rope and the handle forming at least part of a rope-start system of the engine assembly.

CLAUSE 21. The internal combustion engine assembly of any one of clauses 10 to 20, wherein the second flywheel axis is parallel to and offset from the first flywheel axis.

CLAUSE 22. The internal combustion engine assembly of clause 21, wherein the crankshaft axis and the first flywheel axis are coaxial.

CLAUSE 23. The internal combustion engine assembly of any one of clauses 10 to 22, wherein the first flywheel axis extends through the crankcase and the second flywheel axis extends through the cylinder block.

CLAUSE 24. The internal combustion engine assembly of any one of clauses 10 to 23, further comprising a rotary electrical generator operatively connected to the crankshaft, the rotary electrical generator including a stator and a rotor rotating relative to the stator; and wherein the first flywheel includes the rotor.

CLAUSE 25. The internal combustion engine assembly of clause 24, wherein the rotor at least partially surrounds the stator.

CLAUSE 26. The internal combustion engine assembly of any one of clauses 10 to 25, wherein the second flywheel rotates faster than the first flywheel.

CLAUSE 27. The internal combustion engine assembly of clause 26, wherein the second flywheel rotates three times faster than the first flywheel.

CLAUSE 28. The internal combustion engine assembly of any one of clauses 10 to 27, wherein a radius of the second flywheel is greater than a radius of the first flywheel.

CLAUSE 29. The internal combustion engine assembly of any one of clauses 10 to 28, wherein a mass of the second flywheel is smaller than a mass of the first flywheel.

CLAUSE 30. The internal combustion engine assembly of any one of clauses 10 to 29, wherein a moment of inertia of the second flywheel is smaller than a moment of inertia of the first flywheel.

CLAUSE 31. The internal combustion engine assembly of any one of clauses 10 to 30, wherein: an angular kinetic energy of components of the engine assembly turning in the second direction is generally equal to an angular kinetic energy of components of the engine assembly turning in the first direction when the first and second flywheels are rotating; the components of the engine assembly turning in the first direction including at least the crankshaft and the first flywheel; and the components of the engine assembly turning in the second direction including at least the second flywheel.

CLAUSE 32. A marine outboard engine comprising: a cowling; the internal combustion engine assembly according to any one of clauses 1 to 31 disposed at least in part in the cowling; a driveshaft operatively connected to and driven by the crankshaft; a propeller shaft operatively connected to and driven by the driveshaft; and a propeller connected to and driven by the propeller shaft.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An internal combustion engine assembly comprising:
a crankcase;
a cylinder block connected to the crankcase, the cylinder block defining at least one cylinder;
at least one piston disposed in the at least one cylinder;
a crankshaft disposed at least in part in the crankcase and operatively connected to the at least one piston, the crankshaft rotating in a first direction about a crankshaft axis;
a first flywheel operatively connected to and driven by the crankshaft, the first flywheel rotating in the first direction about a first flywheel axis;
a second flywheel operatively connected to and driven by the first flywheel, the second flywheel rotating in a second direction opposite the first direction about a second flywheel axis, the first and second flywheels being disposed externally of the crankcase and the cylinder block on a same side of the crankcase and the cylinder block; and a clutch selectively operatively connecting the crankshaft to the second flywheel.

2. The internal combustion engine assembly of claim 1, wherein at least a portion of the second flywheel is disposed between the first flywheel and at least one of the crankcase and the cylinder block.

3. The internal combustion engine assembly of claim 1, wherein the clutch selectively operatively connects the first flywheel to the second flywheel.

4. The internal combustion engine assembly of claim 3, wherein the clutch disconnects the first flywheel from the second flywheel when the crankshaft rotates above a clutch engagement speed.

5. The internal combustion engine assembly of claim 3, wherein the clutch is coaxial with the crankshaft and the first flywheel, and rotates in the first direction.

6. The internal combustion engine assembly of claim 3, further comprising:
a first gear connected to the clutch; and
a second gear connected to the second flywheel and coaxial with the second flywheel, the second gear engaging the first gear.

7. The internal combustion engine assembly of claim 6, wherein a gear ratio of the first and second gears is less than one, the gear ratio corresponding to a number of teeth of the second gear divided by a number of teeth of the first gear.

8. The internal combustion engine assembly of claim 7, wherein the gear ratio is 1:3.

9. The internal combustion engine assembly of claim 3, further comprising a manual start assembly operatively connected to the second flywheel.

10. The internal combustion engine assembly of claim 9, wherein the manual start assembly comprises:
a rope spool connected to and coaxial with the second flywheel;
a rope at least partially wound around the rope spool; and
a handle connected to the rope,
the rope spool, the rope and the handle forming at least part of a rope-start system of the engine assembly.

11. The internal combustion engine assembly of claim 1, wherein the second flywheel axis is parallel to and offset from the first flywheel axis.

12. The internal combustion engine assembly of claim 11, wherein the crankshaft axis and the first flywheel axis are coaxial.

13. The internal combustion engine assembly of claim 1, further comprising a rotary electrical generator operatively connected to the crankshaft, the rotary electrical generator including a stator and a rotor rotating relative to the stator; and
wherein the first flywheel includes the rotor.

14. The internal combustion engine assembly of claim 1, wherein the second flywheel rotates faster than the first flywheel.

15. The internal combustion engine assembly of claim 14, wherein the second flywheel rotates three times faster than the first flywheel.

16. The internal combustion engine assembly of claim 1, wherein a radius of the second flywheel is greater than a radius of the first flywheel.

17. The internal combustion engine assembly of claim 1, wherein a mass of the second flywheel is smaller than a mass of the first flywheel.

18. The internal combustion engine assembly of claim 1, wherein a moment of inertia of the second flywheel is smaller than a moment of inertia of the first flywheel.

19. The internal combustion engine assembly of claim 1, wherein:
an angular kinetic energy of components of the engine assembly turning in the second direction is generally equal to an angular kinetic energy of components of the engine assembly turning in the first direction when the first and second flywheels are rotating;
the components of the engine assembly turning in the first direction including at least the crankshaft and the first flywheel; and
the components of the engine assembly turning in the second direction including at least the second flywheel.

20. An internal combustion engine assembly comprising:
a crankcase;
a cylinder block connected to the crankcase, the cylinder block defining at least one cylinder;
at least one piston disposed in the at least one cylinder;
a crankshaft disposed at least in part in the crankcase and operatively connected to the at least one piston, the crankshaft rotating in a first direction about a crankshaft axis;
a flywheel operatively connected to and driven by the crankshaft, the flywheel rotating in a second direction opposite the first direction about a flywheel axis;
a clutch selectively operatively connecting the crankshaft to the flywheel;
a first gear connected to the clutch; and
a second gear connected to the flywheel and coaxial with the flywheel, the second gear engaging the first gear.

21. An internal combustion engine assembly comprising:
a crankcase;
a cylinder block connected to the crankcase, the cylinder block defining at least one cylinder;
at least one piston disposed in the at least one cylinder;
a crankshaft disposed at least in part in the crankcase and operatively connected to the at least one piston, the crankshaft rotating in a first direction about a crankshaft axis;
a first flywheel operatively connected to and driven by the crankshaft, the first flywheel rotating in the first direction about a first flywheel axis;
a second flywheel operatively connected to and driven by the first flywheel, the second flywheel rotating in a second direction opposite the first direction about a second flywheel axis,
the first flywheel axis extending through the crankcase and the second flywheel axis extending through the cylinder block; and
a clutch selectively operatively connecting the crankshaft to the second flywheel.

* * * * *